United States Patent
Tang et al.

(10) Patent No.: US 11,646,455 B2
(45) Date of Patent: May 9, 2023

(54) SECONDARY BATTERY, AND BATTERY MODULE, BATTERY PACK, AND DEVICE HAVING SAME

(71) Applicant: CONTEMPORARY AMPEREX TECHNOLOGY CO., LIMITED, Ningde (CN)

(72) Inventors: Huang Tang, Ningde (CN); Ming Zhang, Ningde (CN); Hao Dong, Ningde (CN); Qifan Wu, Ningde (CN); De Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/884,538

(22) Filed: Aug. 9, 2022

(65) Prior Publication Data
US 2022/0399579 A1    Dec. 15, 2022

Related U.S. Application Data

(63) Continuation of application No. PCT/CN2021/075679, filed on Feb. 6, 2021.

(51) Int. Cl.
| | |
|---|---|
| C08F 220/56 | (2006.01) |
| H01M 10/42 | (2006.01) |
| H01M 4/62 | (2006.01) |
| H01M 4/02 | (2006.01) |

(52) U.S. Cl.
CPC ....... *H01M 10/4235* (2013.01); *C08F 220/56* (2013.01); *H01M 4/622* (2013.01); *H01M 4/625* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 6,544,688 B1 | 4/2003 | Cheng |
| 2019/0123339 A1 | 4/2019 | Yushin et al. |
| 2021/0143436 A1 | 5/2021 | Yu |

FOREIGN PATENT DOCUMENTS

| | | | |
|---|---|---|---|
| CN | 106374112 A | 2/2017 | |
| CN | 106558676 A | 4/2017 | |
| CN | 109119637 A | 1/2019 | |
| CN | 201920441399 | * 5/2019 | ........ H01M 10/0525 |

(Continued)

OTHER PUBLICATIONS

The World Intellectual Property Organization (WIPO) International Search Report and Written Opinion for PCT/CN2021/075679 dated Oct. 27, 2021 16 pages (with translation).

(Continued)

*Primary Examiner* — Yoshitoshi Takeuchi
(74) *Attorney, Agent, or Firm* — Anova Law Group, PLLC

(57) ABSTRACT

A secondary battery includes a positive electrode sheet which includes a positive-electrode current collector, a positive-electrode active material layer, and a coating layer arranged between the positive-electrode current collector and the positive-electrode active material layer. The coating layer includes a conductive agent and a copolymer.

16 Claims, 3 Drawing Sheets

(56) References Cited

FOREIGN PATENT DOCUMENTS

| CN | 110265665 A | 9/2019 | | |
|---|---|---|---|---|
| CN | 110400933 A | 11/2019 | | |
| JP | 2016219197 | * 12/2016 | ........... | C09D 129/04 |
| JP | 2016219197 A | 12/2016 | | |

OTHER PUBLICATIONS

Gou Shaohua et al. "Self-assembled acrylamide-based copolymer/surfactant with high-temperature resistance for enhanced oil recovery", Journal of applied polymer science, vol. 134, No. 33, May 7, 2017, p. 45202, ISSN:0021-08995.
The Extended European Search Report for EP application No. 21912324.7 dated Feb. 20, 2023 10 pages.

* cited by examiner

SECONDARY BATTERY, AND BATTERY MODULE, BATTERY PACK, AND DEVICE HAVING SAME

CROSS-REFERENCE TO RELATED APPLICATION

This application is a continuation of International Application No. PCT/CN2021/075679, filed Feb. 6, 2021, the entire content of which is incorporated herein by reference.

TECHNICAL FIELD

The present application relates to a secondary battery, and in particular to a secondary battery having a coating layer between a positive-electrode current collector and a positive-electrode active material layer, and a battery module, battery pack, and device having the secondary battery.

BACKGROUND ART

In the use of a secondary battery, there are repeated charging and discharging processes. During the charging process, the charging upper limit voltage of the secondary battery needs to be controlled by a limiting mechanism. However, when the limiting mechanism fails, the voltage exceeds the safe voltage of the secondary battery, and thus, there will be problems such as lithium precipitating on a negative electrode, oxygen release on a positive electrode, and heat release from the battery, which will seriously lead to thermal runaway inside the battery, resulting in serious safety accidents such as fire and explosion. Therefore, in order to enable the secondary battery to be applied massively, safely and widely, it is needed to improve the overcharge safety of the secondary battery.

SUMMARY

The present application is developed in view of the aforementioned technical problems, and an objective of it is to enable a secondary battery to take better overcharge safety and cycling performance into account at the same time.

In order to achieve the aforementioned objective, the present application provides a secondary battery including a positive electrode sheet which includes: a positive-electrode current collector, a positive-electrode active material layer, and a coating layer arranged between the positive-electrode current collector and the positive-electrode active material layer, wherein the coating layer includes a conductive agent and a copolymer, the copolymer includes the following structural unit (I), structural unit (II) and structural unit (III),

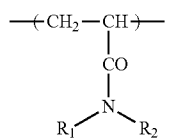
(I)

in the structural unit (I), $R_1$ and $R_2$ each independently represent a hydrogen atom, an unsubstituted or substituted alkyl group having 1-10 carbon atoms, an unsubstituted or substituted alkoxy group having 1-10 carbon atoms, or an unsubstituted or substituted alkenyl group having 1-10 carbon atoms, and a substituent for the substituted alkyl group having 1-10 carbon atoms, the substituted alkoxy group having 1-10 carbon atoms, and the substituted alkenyl group having 1-10 carbon atoms in $R_1$ and $R_2$ is at least one selected from hydroxyl, amino, amide, cyano, and carboxyl,

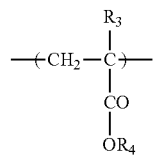
(II)

in the structural unit (II), $R_3$ represents a hydrogen atom, an unsubstituted or substituted alkyl group having 1-10 carbon atoms, an unsubstituted or substituted alkoxy group having 1-10 carbon atoms, an unsubstituted or substituted alkenyl group having 1-10 carbon atoms, or an aryl group having 5-20 carbon atoms, and a substituent for the substituted alkyl group having 1-10 carbon atoms, the substituted alkoxy group having 1-10 carbon atoms, and the substituted alkenyl group having 1-10 carbon atoms in $R_3$ is at least one selected from halogen, hydroxyl, amino, amide, cyano, and carboxyl, $R_4$ represents a hydrogen atom, an unsubstituted or substituted alkyl group having 1-10 carbon atoms, an inorganic metal ion, or —$R_{10}NR_{11}R_{12}$, a substituent for the substituted alkyl group having 1-10 carbon atoms in $R_4$ is at least one selected from halogen, hydroxyl, amino, amide, cyano, and carboxyl, and the inorganic metal ion is a sodium ion, a potassium ion, a lithium ion, a calcium ion, or a magnesium ion, wherein, $R_{10}$ represents an unsubstituted or substituted alkylene group having 1-10 carbon atoms or an unsubstituted or substituted alkenylene group having 2-10 carbon atoms, and a substituent for the substituted alkylene group having 1-10 carbon atoms or the substituted alkenylene group having 2-10 carbon atoms in $R_{10}$ is at least one selected from halogen, hydroxyl, amino, amide, cyano, and carboxyl, $R_{11}$ and $R_{12}$ each independently represent an unsubstituted or substituted alkyl group having 1-10 carbon atoms, an unsubstituted or substituted alkenyl group having 1-10 carbon atoms or an aryl group having 5-20 carbon atoms, and a substituent for the substituted alkyl group having 1-10 carbon atoms and the substituted alkenyl group having 1-10 carbon atoms in $R_{11}$ and $R_{12}$ is at least one selected from halogen, hydroxyl, amino, amide, cyano and carboxyl,

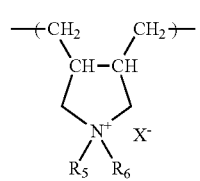
(III)

in the structural unit (III), $R_5$ and $R_6$ each independently represent a hydrogen atom, an unsubstituted or substituted alkyl group having 1-10 carbon atoms, $X^-$ represents an anion selected from a halogen ion, a sulfate ion and a sulfonate ion, and a substituent for the substituted alkyl group having 1-10 carbon atoms in $R_5$ and $R_6$ is at least one selected from halogen, hydroxyl, amino, amide, cyano, and carboxyl.

By disposing the coating including the aforementioned specific copolymer between the positive-electrode current collector and the positive-electrode active material layer, the safety of the battery during overcharging can be effectively improved, and the probability of overheating, fire or explosion of the battery during overcharging can be greatly reduced.

In any embodiment, in the coating layer, the content of the copolymer may be more than 50 wt %, and optionally 65 wt %-85 wt %. By setting the content of the copolymer in the coating layer to the aforementioned range, the electronic conduction between the current collector and the active material layer can be ensured under normal conditions, and a relatively higher cycling capacity retention rate can be maintained. Furthermore, the conductive network of the coating layer is easily destroyed when the battery is overcharged, so that the safety of the battery is improved when the battery is overcharged, and in turn it can be avoided that the resistance of the coating layer is not greatly increased since the conductive network of the coating layer cannot be destroyed when the battery is overcharged.

In any embodiment, the thickness of the coating layer is 0.1-20 μm, optionally 0.3-10 μm, and further optionally 0.5-5 μm. By setting the thickness of the coating layer within the aforementioned range, miniaturization, high cycling capacity retention rate and excellent overcharge safety of the secondary battery can be taken into account at the same time, and in turn, on one hand, the influence on the conductive performance can be avoided, and the battery electrode sheet can be prevented from being thicker, thereby facilitating the miniaturization of the battery; and on the other hand, it can be avoided that after the temperature rise caused by the overcharge of the battery, the resistance of the coating layer increases in a small proportion and thus cannot play the role of increasing the resistance and polarization.

In any embodiment, the conductive agent used in the coating layer includes at least one of conductive graphite, conductive carbon black, Ketjen black, acetylene black, carbon fiber, carbon nanotube, or graphene. By using such a conductive agent in the coating layer, a good conductive network can be formed to ensure good electronic conduction between the current collector and the positive-electrode active material layer.

In any embodiment, the coating layer may further include a binder. Therefore, the coating layer can be made relatively stable, and the application range of the secondary battery is improved.

In any embodiment, the average molar number of monomers of the structural unit (I) is denoted as a, the average molar number of monomers of the structural unit (II) is denoted as b, and the average molar number of monomers of the structural unit (III) is denoted as c, then the copolymer satisfies: $60\% \leq a/(a+b+c) \times 100\%$, and optionally $70\% \leq a/(a+b+c) \times 100\% \leq 85\%$. By setting $a/(a+b+c) \times 100\%$ to a specific range, the bonding force between the coating layer and the positive-electrode current collector and the positive-electrode active material layer can be improved, so that a relatively higher cycling capacity retention rate can be maintained.

In any embodiment, the average molar number of monomers of the structural unit (I) is denoted as a, the average molar number of monomers of the structural unit (II) is denoted as b, and the average molar number of monomers of the structural unit (III) is denoted as c, then the copolymer satisfies: $b/(a+b+c) \times 100\% \leq 20\%$, optionally $5\% \leq b/(a+b+c) \times 100\% \leq 15\%$, and optionally $5\% \leq b/(a+b+c) \times 100\% \leq 10\%$. By setting $b/(a+b+c) \times 100\%$ to a specific range, the bonding force between the coating layer and the positive-electrode current collector and the positive-electrode active material layer can be improved, so that a relatively higher cycling capacity retention rate can be maintained.

In any embodiment, the average molar number of monomers of the structural unit (I) is denoted as a, the average molar number of monomers of the structural unit (II) is denoted as b, and the average molar number of monomers of the structural unit (III) is denoted as c, then the copolymer satisfies: $c/(a+b+c)^x 100\% \leq 20\%$, and optionally $10\% \leq c/(a+b+c) \times 100\% \leq 20\%$. By setting $c/(a+b+c) \times 100\%$ to the aforementioned specific range, when the battery is overcharged, the resistance of the coating layer is greatly improved, playing the role of inhibiting the overcharge of the battery.

In any embodiment, in the aforementioned structural unit (I), $R_1$ and $R_2$ each independently is a hydrogen atom, or an unsubstituted or substituted alkyl group having 1-10 carbon atoms, optionally a hydrogen atom or a linear, branched or cyclic alkyl group having 1-6 carbon atoms, optionally a hydrogen atom or a linear or branched alkyl group having 1-6 carbon atoms, and further optionally a hydrogen atom or a linear alkyl group having 1-3 carbon atoms. The number of carbon atoms in a group is also referred to as a "carbon number" of the group. Therefore, it enables the manufacturing process to be simple and convenient and reduces the production cost.

In any embodiment, in the structural unit (II), $R_3$ is a hydrogen atom, or an unsubstituted or substituted alkyl group having 1-10 carbon atoms, optionally a hydrogen atom or a linear, branched or cyclic alkyl group having 1-6 carbon atoms, further optionally a hydrogen atom or a linear or branched alkyl group having 1-6 carbon atoms, and further optionally a hydrogen atom or a linear alkyl group having 1-3 carbon atoms; $R_4$ is a hydrogen atom, an inorganic metal ion, or an unsubstituted or substituted alkyl group having 1-10 carbon atoms, optionally a hydrogen atom, an inorganic metal ion, or a linear, branched or cyclic alkyl group having 1-6 carbon atoms, further optionally a hydrogen atom, a sodium ion, a potassium ion or a linear or branched alkyl group having 1-6 carbon atoms, and further optionally a hydrogen atom, a sodium ion, a potassium ion or a linear alkyl group having 1-3 carbon atoms. Therefore, it enables the manufacturing process to be simple and convenient and reduces the production cost.

In any embodiment, in the structural unit (III), $R_5$ and $R_6$ each independently is a hydrogen atom, or an unsubstituted or substituted alkyl groups having 1-10 carbon atoms, optionally a hydrogen atom or a linear, branched or cyclic alkyl group having 1-6 carbon atoms, further optionally a hydrogen atom or a linear or branched alkyl group having 1-6 carbon atoms, and further optionally a hydrogen atom or a linear alkyl group having 1-3 carbon atoms; $X^-$ is an anion selected from a halogen ion, optionally an anion selected from a chloride ion and a bromide ion, and further optionally the chloride ion. Therefore, it enables the manufacturing process to be simple and convenient and reduces the production cost.

In any embodiment, the structural units (I), (II), and (III) are copolymerized in a random or block manner.

In any embodiment, the copolymer has a number average molecular weight of 10,000 to 100,000, and optionally 15,000 to 50,000.

A second aspect of the present application provides a battery module including the secondary battery according to the first aspect of the present application.

A third aspect of the present application provides a battery pack including the battery module according to the second aspect of the present application.

A fourth aspect of the present application provides a device including at least one of the secondary battery according to the first aspect of the present application, the battery module according to the second aspect of the present application, or the battery pack according to the third aspect of the present application.

The battery module, battery pack and device of the present application include the secondary battery provided by the present application, and thus have at least the same advantages as the secondary battery.

DETAILED DESCRIPTION

In order to make the objectives, technical solutions and advantages of the present application clearer, the embodiments of the present application will be described in detail below with reference to the accompanying drawings. However, it should be understood by those of ordinary skills in the art that these embodiments are only used for illustrating the technical solutions of the present application, rather than limiting them.

For the sake of conciseness, the present application specifically discloses some numerical ranges. However, any lower limit can be combined with any upper limit to form an unspecified range; and any lower limit can be combined with other lower limits to form an unspecified range, and likewise, any upper limit can be combined with any other upper limit to form an unspecified range. Furthermore, every point or single numerical value between the endpoints of a range is included within the range, even if not expressly recited. Moreover, each separately disclosed point or single numerical value itself can be used as a lower or upper limit to form an unspecified range in combination with any other point or single numerical value or with other lower or upper limits.

In the description herein, it should be noted that, "above" and "below" are inclusive of the numerical numeral itself, and the meaning of "more" in "one or more" is two and more, unless otherwise specified.

The aforementioned summary of the present application is not intended to describe each disclosed embodiment or every implementation of the present application. The following description illustrates exemplary embodiments more specifically. In various places throughout the present application, guidance is provided through a series of examples, which examples can be used in various combinations. In various examples, the enumeration is merely a representative group, and should not be construed as exhaustive.

Secondary Battery

A secondary battery refers to a battery that can be used continually by activating a active material in a charging manner, after the battery is discharged. Generally, the secondary battery pack includes a positive electrode sheet, a negative electrode sheet, a separator and an electrolyte. During the charging and discharging process of the battery, active ions are intercalated and deintercalated back and forth between the positive electrode sheet and the negative electrode sheet. The separator is arranged between the positive electrode sheet and the negative electrode sheet, which can insulate electrons, prevent internal short circuit, and meanwhile=allow active ions to pass through and move between the positive and negative electrodes, playing the role of isolating. The electrolyte plays the role of conducting ions between the positive electrode sheet and the negative electrode sheet.

[Positive Electrode Sheet]

Figure 1:
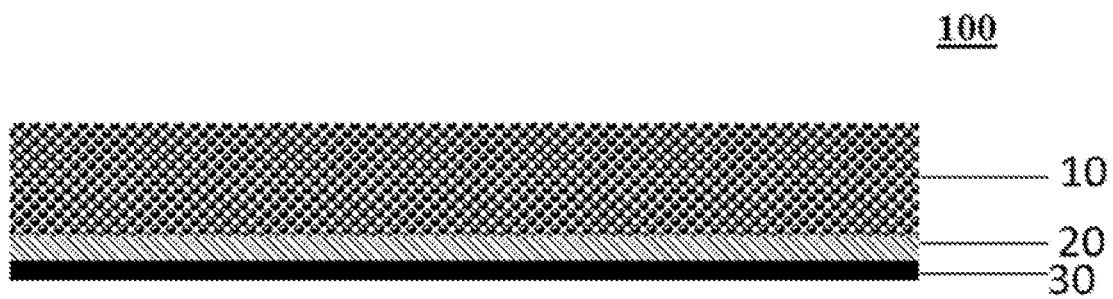
FIG. 1 is a schematic structural diagram of one embodiment of a positive electrode sheet in a secondary battery of the present application.
Figure 2:
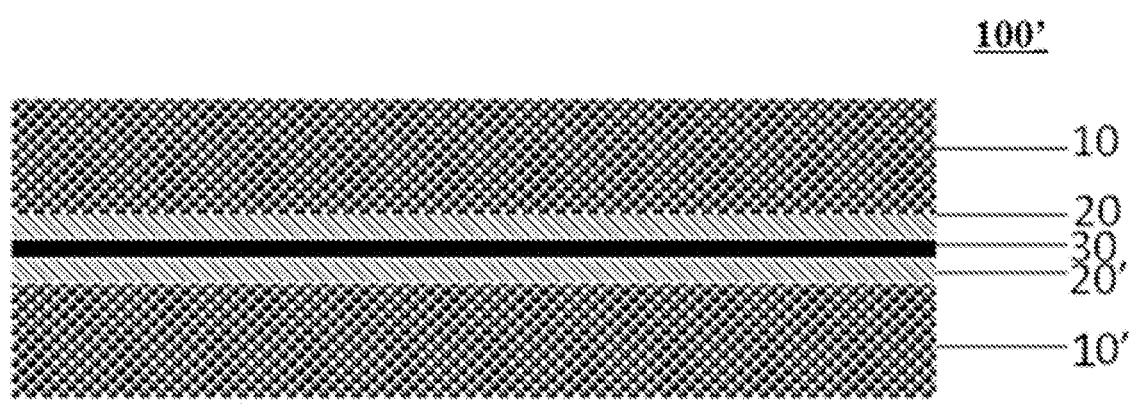
FIG. 2 is a schematic structural diagram of another embodiment of a positive electrode sheet in a secondary battery of the present application.

FIG. 1 is a schematic structural diagram of one embodiment of a positive electrode sheet in a secondary battery of the present application. As shown in FIG. 1, the positive electrode sheet 100 of the present application includes a positive-electrode current collector 30, a positive-electrode active material layer 10, and a coating layer 20 arranged between the positive-electrode current collector 30 and the positive-electrode active material layer 10. Moreover, although the embodiment in which the coating layer 20 and the positive-electrode active material layer 10 are provided only on a single side of the positive-electrode current collector 30 is shown in FIG. 1, the present application is not limited to this. FIG. 2 is a schematic structural diagram of another embodiment of a positive electrode sheet in the present application. As shown in FIG. 2, the positive electrode sheet 100' of another embodiment of the present application may be provided with the coating layer 20, the positive-electrode active material layer 10, a coating layer 20' and a positive-electrode active material layer 10' on two sides of the positive-electrode current collector 30, respectively. The coating layer 20 is located between the positive-electrode current collector 30 and the positive-electrode active material layer 10, and the coating layer 20' is located between the positive-electrode current collector 30 and the positive-electrode active material layer 10'. The positive-electrode active material layer 10 and the positive-electrode active material layer 10' may be the same or different, and optionally both are the same, so that the manufacturing process is simple and convenient. The coating layer 20 and the coating layer 20' may be the same or different, and optionally both are the same, so that the manufacturing process is simple and convenient.

The coating layers 20 and 20' include a conductive agent and a copolymer. The copolymer includes the following structural units (I), (II) and (III).

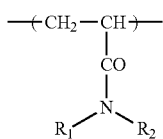

(I)

(in the structural unit (I), $R_1$ and $R_2$ each independently represent a hydrogen atom, an unsubstituted or substituted alkyl group having 1-10 carbon atoms, an unsubstituted or substituted alkoxy group having 1-10 carbon atoms, or an unsubstituted or substituted alkenyl group having 1-10 carbon atoms, and a substituent for the substituted alkyl group having 1-10 carbon atoms, the substituted alkoxy group having 1-10 carbon atoms, and the substituted alkenyl group having 1-10 carbon atoms in $R_1$ and $R_2$ is at least one selected from hydroxyl, amino, amide, cyano, and carboxyl.)

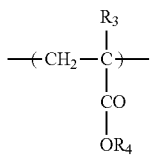

(II)

(in the structural unit (II), $R_3$ represents a hydrogen atom, an unsubstituted or substituted alkyl group having 1-10 carbon atoms, an unsubstituted or substituted alkoxy group having 1-10 carbon atoms, an unsubstituted or substituted alkenyl group having 1-10 carbon atoms, or an aryl group having 5-20 carbon atoms, and a substituent for the substituted alkyl group having 1-10 carbon atoms, the substituted alkoxy group having 1-10 carbon atoms, and the substituted alkenyl group having 1-10 carbon atoms in $R_3$ is at least one selected from halogen, hydroxyl, amino, amide, cyano, and carboxyl, $R_4$ represents a hydrogen atom, an unsubstituted or substituted alkyl group having 1-10 carbon atoms, an inorganic metal ion, or —$R_{10}NR_{11}R_{12}$, a substituent for the substituted alkyl group having 1-10 carbon atoms in $R_4$ is at least one selected from halogen, hydroxyl, amino, amide, cyano, and carboxyl, and the inorganic metal ion is a sodium ion, a potassium ion, a lithium ion, a calcium ion, or a magnesium ion, wherein, $R_{10}$ represents an unsubstituted or substituted alkylene group having 1-10 carbon atoms or an unsubstituted or substituted alkenylene group having 2-10 carbon atoms, and a substituent for the substituted alkylene group having 1-10 carbon atoms or the substituted alkenylene group having 2-10 carbon atoms in $R_{10}$ is at least one selected from halogen, hydroxyl, amino, amide, cyano, and carboxyl, $R_{11}$ and $R_{12}$ each independently represent an unsubstituted or substituted alkyl group having 1-10 carbon atoms, an unsubstituted or substituted alkenyl group having 1-10 carbon atoms or an aryl group having 5-20 carbon atoms, and a substituent for the substituted alkyl group having 1-10 carbon atoms and the substituted alkenyl group having 1-10 carbon atoms in $R_{11}$ and $R_{12}$ is at least one selected from halogen, hydroxyl, amino, amide, cyano and carboxyl.)

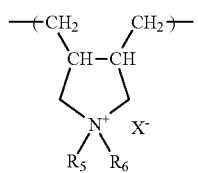

(III)

(in the structural unit (III), $R_5$ and $R_6$ each independently represent a hydrogen atom, an unsubstituted or substituted alkyl group having 1-10 carbon atoms, $X^-$ represents an anion selected from a halogen ion, a sulfate ion and a sulfonate ion, and a substituent for the substituted alkyl group having 1-10 carbon atoms in $R_5$ and $R_6$ is at least one selected from halogen, hydroxyl, amino, amide, cyano, and carboxyl.)

By disposing the coating including the aforementioned specific copolymer between the positive-electrode current collector and the positive-electrode active material layer, the resistance of the coating layer is greatly improved when the battery is overcharged, so that the safety of the battery during overcharging can be effectively improved, and the probability of overheating, fire or explosion of the battery during overcharging can be greatly reduced.

The mechanism of action is not yet clear, but the inventor of the present application speculate as follows. That is, under normal conditions, the conductive agent is uniformly dispersed in the copolymer, so that the coating layer has good conductivity to ensure the electronic conduction between the current collector and the active material layer, so that the secondary battery can perform well in a normal environment. At this time, the resistance of the coating layer is denoted as R0. On the other hand, when the battery is overcharged, the temperature inside the battery increases, and the copolymer in the coating layer undergoes a violent movement of molecular chains, which causes the conductive materials dispersed in the copolymer to aggregate and destroys the conductive network of the coating layer, resulting in a significant increase in the resistance of the coating layer, and the resistance after the temperature rise is recorded as $R_1$. The resistance $R_1$ at more than 130° C. after the temperature rise is more than 5 times of the resistance R0 under a normal state. Due to the rise of the resistance, the internal polarization of the battery increases rapidly, so that the voltage rises rapidly, reaching an overcharge cut-off voltage, and thus the battery cannot be charged continually, thereby improving the safety of the battery during overcharging.

The inventor has found through in-depth research that, on the basis of the secondary battery of the present application satisfying the aforementioned design conditions, the performance of the secondary battery can be further improved if it also optionally satisfies one or more of the following parameters.

In some embodiments, in the aforementioned structural unit (I), $R_1$ and $R_2$ each independently is a hydrogen atom, or an unsubstituted or substituted alkyl group having 1-10 carbon atoms, optionally a hydrogen atom or a linear, branched or cyclic alkyl group having 1-6 carbon atoms, further optionally a hydrogen atom or a linear or branched alkyl group having 1-6 carbon atoms, and further optionally a hydrogen atom or a linear alkyl group having 1-3 carbon atoms.

In some embodiments, in the aforementioned structural unit (II), $R_3$ is a hydrogen atom, or an unsubstituted or substituted alkyl group having 1-10 carbon atoms, optionally a hydrogen atom or a linear, branched or cyclic alkyl group having 1-6 carbon atoms, further optionally a hydrogen atom or a linear or branched alkyl group having 1-6 carbon atoms, and further optionally a hydrogen atom or a linear alkyl group having 1-3 carbon atoms; $R_4$ is a hydrogen atom, an inorganic metal ion, or an unsubstituted or substituted alkyl group having 1-10 carbon atoms, optionally a hydrogen atom, an inorganic metal ion, or a linear, branched or cyclic alkyl group having 1-6 carbon atoms, further optionally a hydrogen atom, a sodium ion, a potassium ion or a linear or branched alkyl group having 1-6 carbon atoms, and further optionally a hydrogen atom, a sodium ion, a potassium ion or a linear alkyl group having 1-3 carbon atoms.

In some embodiments, in the aforementioned structural unit (III), $R_5$ and $R_6$ each independently is a hydrogen atom, or an unsubstituted or substituted alkyl groups having 1-10 carbon atoms, optionally a hydrogen atom or a linear, branched or cyclic alkyl group having 1-6 carbon atoms, further optionally a hydrogen atom or a linear or branched alkyl group having 1-6 carbon atoms, and further optionally a hydrogen atom or a linear alkyl group having 1-3 carbon atoms; X" is an anion selected from a halogen ion, optionally an anion selected from a chloride ion and a bromide ion, and further optionally the chloride ion.

In some embodiments, in the copolymer, the average molar number of monomers of the structural unit (I) is denoted as a, the average molar number of monomers of the structural unit (II) is denoted as b, and the average molar number of monomers of the structural unit (III) is denoted as c, then the copolymer satisfies: $a/(a+b+c) \times 100\%$ is greater than 60%, and optionally 70%-85%. By controlling $a/(a+b+c) \times 100\%$ to a specific range, the bonding force between the coating layer and the positive-electrode current collector and the positive-electrode active material layer can be improved, so that a relatively higher cycling capacity retention rate can be maintained.

In some embodiments, in the copolymer, $b/(a+b+c) \times 100\%$ is below 20%, optionally 5%-15%, and optionally 5%-10%. By controlling $b/(a+b+c)$ to a specific range, the bonding force between the coating layer and the positive-electrode current collector and the positive-electrode active material layer can be improved, so that a relatively higher cycling capacity retention rate can be maintained.

In some embodiments, in the copolymer, $c/(a+b+c) \times 100\%$ is below 20%, and optionally 10%-20%. By controlling $c/(a+b+c)$ within a specific range, the resistance of the coating layer can be further increased when the battery is overcharged, thereby further improving the overcharge safety of the battery.

In some embodiments, the copolymer has a number average molecular weight of 10,000 to 100,000, optionally 15,000 to 50,000, and optionally 30,000 to 50,000. By making the number average molecular weight of the copolymer within the aforementioned range, high mechanical strength, high thermal stability, and excellent overcharge safety can be taken into account at the same time, and it can be avoided that the movement of the molecular chain of the copolymer becomes difficult, which otherwise causes that it is difficult to destroy the conductive network of the coating layer during overcharge of the battery and thus the overcharge safety of the battery cannot be improved. On the other hand, it is possible to avoid that the mechanical strength of the coating layer is reduced and thus the battery is easily broken when it is subjected to an external force, and in turn, it is possible to avoid that the thermal stability of the copolymer is reduced and thus the copolymer is melted or degraded during the temperature rise due to overcharge of the battery, etc.

In some embodiments, the copolymer may also include other structural units. The other structural units may include, but are not limited to, a structural unit derived from olefins, a structural unit derived from halogenated olefins, a structural unit derived from cycloalkanes, and the like.

In some embodiments, the structural units (I), (II), and (III) can be copolymerized in a random or block manner.

The copolymer of the present application can be synthesized by a method commonly used in the art. For example, it can include, but is not limited to, a method for manufacturing the copolymer of the present application by separately adding the structural unit (I), the structural unit (II), the structural unit (III) and other structural units as required into a reaction kettle, and copolymerizing them under an atmosphere of an inert gas (e.g., nitrogen) at a certain temperature; and a method for manufacturing the copolymer of the present application by respectively polymerizing the structural unit (I) and the structural unit (II) at a certain temperature, and then respectively adding a polymer obtained by polymerization of the structural unit (I) and a polymer obtained by polymerization of the structural unit (II) into a reaction kettle, then adding the structural unit (III) and other structural units as required, and copolymerizing them at a certain temperature under an atmosphere of an inert gas such as nitrogen, etc.

In some embodiments, the conductive agent includes at least one of conductive graphite, conductive carbon black, Ketjen black, acetylene black, carbon fiber, carbon nanotube, or graphene. By including such a conductive agent in the coating layer, a good conductive network can be formed to ensure good electronic conduction between the current collector and the positive-electrode active material layer.

In some embodiments, the coating layer further includes a binder. The binder may include, but is not limited to, styrene-acrylic emulsion, sodium carboxymethyl cellulose, polyvinyl alcohol, polyacrylamide, polyacrylate, and the like.

In some embodiments, in the coating layer, the content of the copolymer may be more than 50 wt %, and optionally more than 65 wt %. By setting the content of the copolymer in the coating layer to the aforementioned range, the electronic conduction between the current collector and the active material layer can be ensured under normal conditions, and a relatively higher cycling capacity retention rate can be maintained. Furthermore, the conductive network of the coating layer is easily destroyed when the battery is overcharged, so that the safety of the battery is improved when the battery is overcharged, and in turn it can be avoided that the resistance of the coating layer is not greatly increased since the conductive network of the coating layer cannot be destroyed when the battery is overcharged. Optionally, the content of the copolymer is below 85 wt %.

In some embodiments, in the coating layer, the content of the conductive agent may be 10-25 wt %. By setting the content of the conductive agent to the aforementioned range, the coating layer can be made to have good conductivity under normal conditions to ensure the electronic conduction between the current collector and the active material layer, so that the secondary battery performs well in a normal environment.

In some embodiments, the thickness of the coating layer is 0.1-20 μm, optionally 0.3-10 μm, and further optionally 0.5-5 μm. By setting the thickness of the coating layer within the aforementioned range, miniaturization, high cycling capacity retention rate and excellent overcharge safety of the secondary battery can be taken into account at the same time, and in turn, on one hand, the influence on the conductive performance can be avoided, and the battery electrode sheet can be prevented from being thicker, which otherwise goes against the miniaturization of the battery; and on the other hand, it can be avoided that after the temperature rise caused by the overcharge of the battery, the resistance of the coating layer increases in a small proportion and thus cannot play the role of increasing the resistance and polarization.

In the secondary battery of the present application, the positive-electrode active material layers 10 and 10' include a positive-electrode active material. The positive-electrode active material can include, but not limited to a positive-electrode current collector and an positive-electrode film layer arranged on at least one surface of the positive-electrode current collector, wherein the positive-electrode film layer includes a positive-electrode active material, including but not limited to lithium cobaltate, lithium nickel manganese cobaltate, lithium nickel manganese aluminate, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel lithium nickel manganate, lithium titanate, etc. One or more of these can be used as the positive-electrode active material.

The positive-electrode active material layers 10, 10' also optionally include a conductive agent. However, the type of the conductive agent is not specifically limited, and can be selected by those skilled in the art according to actual needs. As an example, the conductive agent can be selected from one or more of superconducting carbon, acetylene black, carbon black, Ketjen black, carbon dots, carbon nanotubes, graphene and carbon nanofibers.

In the secondary battery of the present application, a metal foil or a composite current collector can be employed as the positive-electrode current collector 30. For example, as the metal foil, aluminum foil can be employed. The composite current collector may include a high molecular material substrate layer and a metal layer formed on at least one surface of the high molecular material substrate layer. The composite current collector can be formed by forming a metal material (e.g., aluminum, aluminum alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

The positive electrode sheet of the present application can be prepared according to a commonly-used method in the art. Specifically, a coating layer can be formed on at least one surface of the current collector by gravure coating, spray coating, and the like coating methods or hot-pressing compounding and the like methods; the positive-electrode active material, the conductive agent and the binder are dispersed in a solvent (e.g., N-methyl pyrrolidone (NMP)) to prepare a positive electrode slurry, the positive electrode slurry is coated onto the coating layer, and subjected to oven-drying, cold pressing and the like procedures to obtain the positive electrode sheet.

[Negative Electrode Sheet]

In a secondary battery, the negative electrode sheet generally includes a negative-electrode current collector and a negative-electrode active material layer arranged on at least one surface of the negative-electrode current collector, and the negative-electrode active material layer includes a negative-electrode active material.

In the secondary battery of the present application, a negative-electrode active material commonly used for preparing a negative electrode of a secondary battery in the art can be used as the negative-electrode active material, such as graphite, a silicon-based material, and the like. The aforementioned graphite may include artificial graphite, natural graphite, or a mixture thereof. The silicon-based material can be selected from one or more of elemental silicon, a silicon oxide compound (e.g. silicon (II) oxide), a silicon-carbon composite, a silicon-nitrogen composite and silicon alloy.

As an example, the negative-electrode current collector has two opposite surfaces in its own thickness direction, and the negative-electrode active material layer is arranged on either or both of the opposite surfaces of the negative-electrode current collector.

In the secondary battery of the present application, a metal foil or a composite current collector can be employed as the negative-electrode current collector. For example, as the metal foil, a copper foil can be employed. The composite current collector may include a high molecular material substrate layer and a metal layer formed on at least one surface of the high molecular material substrate. The composite current collector can be formed by forming a metal material (e.g., copper, copper alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

In the secondary battery of the present application, the negative-electrode active material layer usually includes a negative-electrode active material, an optional binder, an optional conductive agent and other optional adjuvants, and is usually formed by coating and drying a negative-electrode slurry. The negative electrode slurry is usually formed by dispersing the negative-electrode active material, the optional conductive agent, the optional binder, other optional auxiliary agents and the like in a solvent, and stirring uniformly. The solvent can be N-methyl pyrrolidone (NMP) or deionized water.

As an example, the conductive agent can be selected from one or more of superconducting carbon, acetylene black, carbon black, Ketjen black, carbon dots, carbon nanotubes, graphene and carbon nanofibers.

As an example, the binder can be selected from one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMC S).

Other optional adjuvants are for example a thickener (such as sodium carboxymethylcellulose (CMC-Na)), etc.

[Electrolyte]

The examples of the present application has no specific limitation on the type of the electrolyte, which can be selected according to requirements. For example, the electrolyte can be solid or liquid.

In some embodiments, the electrolyte is liquid and typically includes an electrolyte salt and a solvent.

As an example, the electrolyte salt can be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalate)borate (LiBOB), lithium difluorophosphate (LiPO$_2$F$_2$), lithium difluoro bis(oxalato)phosphate (LiDFOP) and lithium tetrafluoro(oxalato)phosphate (LiTFOP).

As an example, the solvent can be one or more selected from fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, an additive is optionally included in the electrolyte. For example, the electrolyte may include a negative-electrode film-forming additive, a positive-electrode film-forming additive, an additive for improving the overcharge performance of the battery, an additive for improving the high temperature performance of the battery, an additive for improving the low temperature performance of the battery, and the like.

[Separator]

The examples of the present application has no particular limitation on the type of the separator, and any well-known porous-structure separator for the secondary battery can be selected for use. For example, the separator can be one or more selected from a thin glass fiber film, a thin non-woven film, a thin polyethylene film, a thin polypropylene film, a thin polyvinylidene fluoride film, and a multilayer composite thin film including one or more than two of the above.

In some embodiments, the secondary battery may be a lithium-ion secondary battery.

In some embodiments, the positive electrode sheet, the negative electrode sheet and the separator can be made into an electrode assembly by a winding process or a lamination process.

In some embodiments, the secondary battery may include an outer package. The outer package can be used for encapsulating the aforementioned electrode assembly and the electrolyte.

In some embodiments, the outer package of the secondary battery may be a hard case, such as a hard plastic case, an aluminum case, a steel case, etc. The outer package of the secondary battery may also be a soft package, such as a bag-type soft package. The material of the soft package can be plastic, such as one or more of polypropylene (PP), polybutylene terephthalate (PBT), polybutylene succinate (PBS) and the like.

Figure 3:
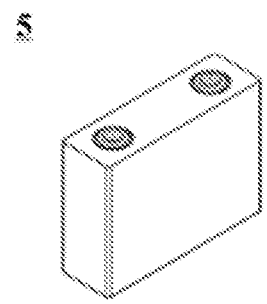
FIG. 3 is a schematic diagram of a secondary battery according to one embodiment of the present application.

The examples of the present application has no particular limitation on the shape of the secondary battery, which can be cylindrical, square or any other shape. For example, FIG. 3 shows a secondary battery 5 with a square structure as an example.

Figure 4:
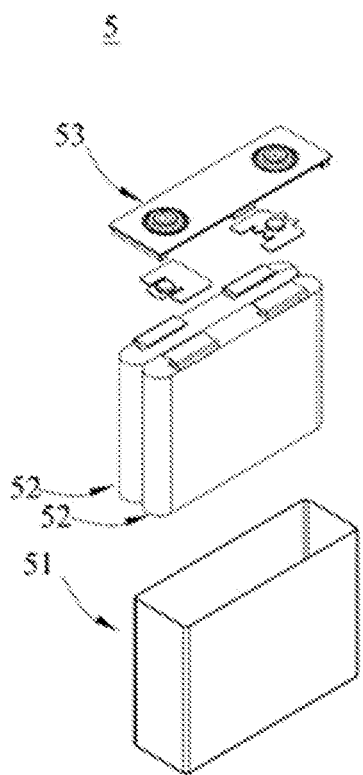
FIG. 4 is an exploded view of the secondary battery according to one embodiment of the present application shown in FIG. 3.

In some embodiments, referring to FIG. 4, the outer package may include a case 51 and a cover plate 53. The case 51 may include a bottom plate and a side plate connected to the bottom plate, and the bottom plate and the side plate enclose to form an accommodating cavity. The case 51 has an opening in communication with the accommodating cavity, and the cover plate 53 can cover the opening to close the accommodating cavity. The positive electrode sheet, the negative electrode sheet and the separator can be subjected to a winding or lamination process to form a electrode assembly 52. The electrode assembly 52 is encapsulated in the accommodating cavity. The electrode assembly 52 is soaked in the electrolyte solution. The number of electrode assemblies 52 included in the secondary battery 5 may be one or more, and can be adjusted according to requirements.

In some embodiments, the secondary battery can be assembled into a battery module, the number of secondary batteries included in the battery module can be multiple, and the specific number can be adjusted according to the application and capacity of the battery module.

Figure 5:
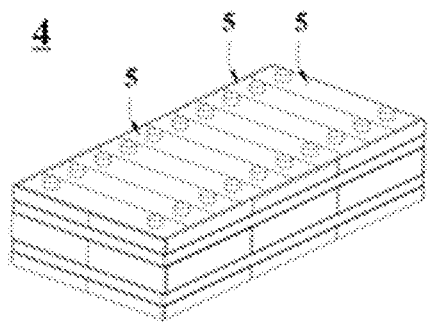
FIG. 5 is a schematic diagram of a battery module according to one embodiment of the present application.

FIG. 5 shows a battery module 4 as an example. Referring to FIG. 5, in the battery module 4, multiple secondary batteries 5 may be sequentially arranged along a length direction of the battery module 4. Of course, they can also be arranged in any other way. The multiple secondary batteries 5 can be further fixed by fasteners.

Optionally, the battery module 4 may further include a shell having an accommodating space in which the multiple secondary batteries 5 are accommodated.

In some embodiments, the aforementioned battery modules can further be assembled into a battery pack, and the number of battery modules included in the battery pack can be adjusted according to the application and capacity of the battery pack.

Figure 6:
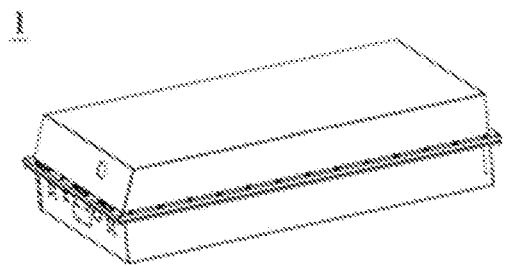
FIG. 6 is a schematic diagram of a battery pack according to one embodiment of the present application.
Figure 7:
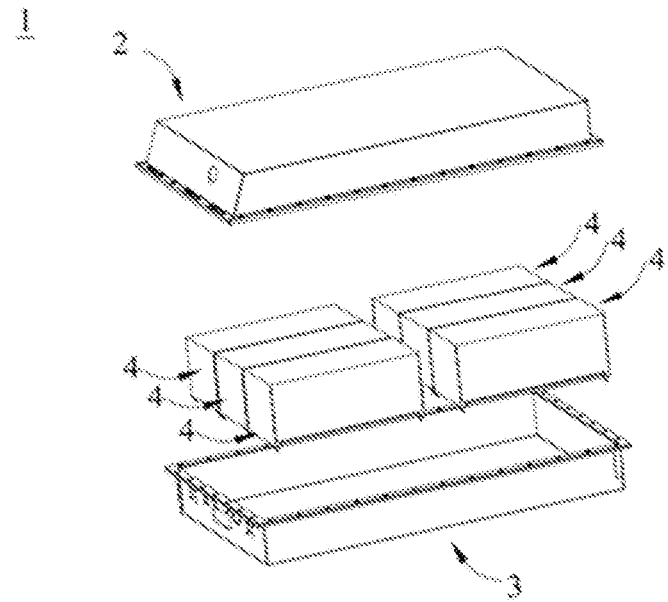
FIG. 7 is an exploded view of the battery pack according to one embodiment of the present application shown in FIG. 6.

FIGS. 6 and 7 show a battery pack 1 as an example. Referring to FIGS. 6 and 7, the battery pack 1 may include a battery box and multiple battery modules 4 disposed in the battery box. The battery box includes an upper box body 2 and a lower box body 3, the upper box body 2 can cover the lower box body 3 to form a closed space for accommodating the battery modules 4. The multiple battery modules 4 can be arranged in the battery box in any way.

Device

Another aspect of the present application provides a device including at least one of the secondary battery, battery module, or battery pack provided by the present application. The secondary battery can be used as a power source of the device, and can also be used as an energy storage unit of the device. The device can be, but not limited to, mobile devices (e.g., a mobile phone, a laptop, etc.), electric vehicles (e.g., a all-electric vehicle, a hybrid electric vehicle, a plug-in hybrid electric vehicle, an electric bicycle, an electric scooter, an electric golf cart, an electric truck, etc.), electric trains, ships and satellites, energy storage systems, etc.

for the device, the secondary battery, battery module or battery pack can be selected according to the use requirements of the device.

Figure 8:
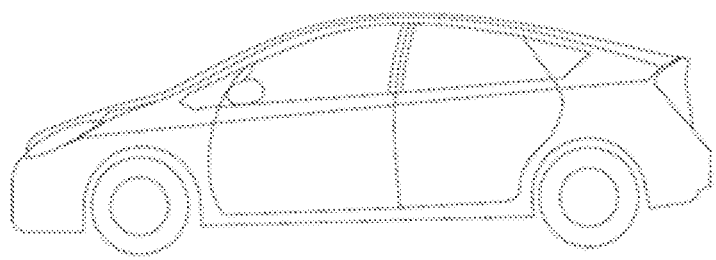
FIG. 8 is a schematic diagram of a device in which a secondary battery is used as a power source, according to one embodiment of the present application.

FIG. 8 shows a device as an example. The device is a all-electric vehicle, a hybrid electric vehicle or a plug-in hybrid electric vehicle, and the like. In order to satisfy the requirements of the device for high power and high energy density of the secondary battery, the battery pack or battery module can be employed.

As another example, the device may be a mobile phone, a tablet, a laptop, etc. Lighting and thinning of the device is generally required, and thus the secondary battery can be employed as the power source.

EXAMPLES

Examples of the present application will be described hereinafter. The following examples are illustrative and only for explaining the present application, and should not be construed as limiting the present application. If no specific technology or condition is indicated in the examples, it shall be carried out according to the technology or condition described in the literature in the art or according to product specifications. All of the used agents or instruments which are not specified with the manufacturer are conventional commercially-available products. Unless otherwise specified, the content of each component in the examples of the present application is based on mass.

The raw materials used in the preparation of the following respective copolymers and the structural units generated therefrom are shown in Table 1.

TABLE 1

| Serial Number | Raw material | Generated structural unit |
|---|---|---|
| 1 | CH₂=CH–CO–NH₂ (Raw material 1-1) | –(CH₂–CH)– –CO–NH₂ (Structural unit (I-1)) |
| 2 | CH₂=CH–CO–N(CH₃)₂ (Raw material 1-2) | –(CH₂–CH)– –CO–N(CH₃)₂ (Structural unit (I-2)) |
| 3 | CH₂=C(H)–CO–OH (Raw material 2-1) | –(CH₂–C(H))– –CO–OH (Structural unit (II-1)) |
| 4 | CH₂=C(H)–CO–O–CH₂CH₃ (Raw material 2-2) | –(CH₂–C(H))– –CO–O–CH₂CH₃ (Structural unit (II-2)) |
| 5 | CH₂=C(CH₃)–CO–O–CH₂CH₃ (Raw material 2-3) | –(CH₂–C(CH₃))– –CO–O–CH₂CH₃ (Structural unit (II-3)) |
| 6 | H₂C=CH–CH₂–N⁺(CH₂CH₃)(CH₂CH₃)–CH₂–CH=CH₂ Cl⁻ (Raw material 3-1) | –(CH₂–CH–CH–CH₂)– ring with N⁺(CH₂CH₃)(CH₂CH₃) Cl⁻ (Structural unit (III-1)) |

TABLE 1-continued

| Serial Number | Raw material | Generated structural unit |
|---|---|---|
| 7 | 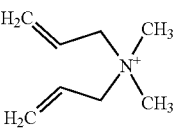 Raw material 3-2 | Structural unit (III-2) |

I. Preparation of Copolymer 1

Raw materials 1-1, 2-1 and 3-1 are dissolved in water at a mass ratio of 80:5:15, and stirred for dissolving them. Next, high-pressure nitrogen is introduced for 10 min, and ammonia water is introduced while the addition of nitrogen, and heated up to 60° C., and added with iron powder, a AlCl₃ aqueous solution with a concentration of 20% and K₂S₂O₈ as an initiator, adjusted with sulfuric acid and a sodium hydroxide solution until the pH of the reaction system is about 7, and reacted at a constant reaction temperature of 65° C. for 4 hours. Then, the heating was stopped, and the mixture was stirred and sufficiently cooled, and then dried and aged for 8 hours to obtain the copolymer 1. The copolymer 1 includes a structural unit (I-1), a structural unit (II-1) and a structural unit (III-1). Also, the copolymer 1 satisfies: $a/(a+b+c)^x$ 100% is 80%, $b/(a+b+c) \times 100\%$ is 5%, $c/(a+b+c) \times 100\%$ is 15%, and the number average molecular weight is 30,000.

The preparation methods of copolymers 2-16 are similar to that of the copolymer 1, except that the types and adding amount of respective raw materials, etc., are adjusted. See Table 2 below for details.

For each copolymer obtained above, the molecular weight and the ratio of each structural unit can be determined by the following method.

1. Determination of Molecular Weight

The prepared copolymer is dissolved in water, and determined with a gel permeation chromatograph (GPC) (model: Agilent GPC 50, manufacturer: Agilent) for the number average molecular weight of the prepared copolymer.

2. Determination of the Ratio of Each Structural Unit

The prepared copolymer is dissolved in deuterated water to obtain a sample to be tested, the sample is placed in a nuclear magnetic tube, and determined with a 400 MHz nuclear magnetic resonance instrument (model: Bruker Avance III 400 MHz NMR, manufacturer: Bruker) for its H spectrum, so as to observe the peak ratio of different monomers of it to determine the ratio of different monomers.

TABLE 2

| | Raw material as used | | | | | |
|---|---|---|---|---|---|---|
| | Raw material 1 | the added parts by mass of the raw material 1 | Raw material 2 | the added parts by mass of the raw material 2 | Raw material 3 | the added parts by mass of the raw material 3 |
| Copolymer 1 | 1-1 | 80 | 2-1 | 5 | 3-1 | 15 |
| Copolymer 2 | 1-1 | 80 | 2-2 | 5 | 3-1 | 15 |
| Copolymer 3 | 1-1 | 80 | 2-3 | 5 | 3-1 | 15 |
| Copolymer 4 | 1-1 | 80 | 2-1 | 5 | 3-2 | 15 |
| Copolymer 5 | 1-1 | 80 | 2-2 | 5 | 3-2 | 15 |
| Copolymer 6 | 1-1 | 80 | 2-3 | 5 | 3-2 | 15 |
| Copolymer 7 | 1-2 | 80 | 2-1 | 5 | 3-1 | 15 |
| Copolymer 8 | 1-2 | 80 | 2-2 | 5 | 3-1 | 15 |
| Copolymer 9 | 1-2 | 80 | 2-3 | 5 | 3-1 | 15 |
| Copolymer 10 | 1-2 | 80 | 2-1 | 5 | 3-2 | 15 |
| Copolymer 11 | 1-2 | 80 | 2-2 | 5 | 3-2 | 15 |
| Copolymer 12 | 1-2 | 80 | 2-3 | 5 | 3-2 | 15 |
| Copolymer 13 | 1-1 | 60 | 2-1 | 20 | 3-2 | 20 |
| Copolymer 14 | 1-1 | 70 | 2-1 | 10 | 3-2 | 20 |
| Copolymer 15 | 1-1 | 85 | 2-1 | 5 | 3-2 | 10 |
| Copolymer 16 | 1-1 | 80 | 2-1 | 20 | / | / |

| | Composition of copolymer | | | | | | |
|---|---|---|---|---|---|---|---|
| | Structural unit (I) | Structural unit (II) | Structural unit (III) | $a/(a+b+c) \times 100\%$ | $b/(a+b+c) \times 100\%$ | $c/(a+b+c) \times 100\%$ | Number Average Molecular Weight |
| Copolymer 1 | 1-1 | 11-1 | 111-1 | 80% | 5% | 15% | 30000 |
| Copolymer 2 | 1-1 | 11-2 | 111-1 | 80% | 5% | 15% | 30000 |
| Copolymer 3 | 1-1 | 11-3 | 111-1 | 80% | 5% | 15% | 30000 |
| Copolymer 4 | 1-1 | 11-1 | 111-2 | 80% | 5% | 15% | 30000 |
| Copolymer 5 | 1-1 | 11-2 | 111-2 | 80% | 5% | 15% | 30000 |
| Copolymer 6 | 1-1 | 11-3 | 111-2 | 80% | 5% | 15% | 30000 |
| Copolymer 7 | 1-2 | 11-1 | 111-1 | 80% | 5% | 15% | 30000 |
| Copolymer 8 | 1-2 | 11-2 | 111-1 | 80% | 5% | 15% | 30000 |
| Copolymer 9 | 1-2 | 11-3 | 111-1 | 80% | 5% | 15% | 30000 |
| Copolymer 10 | 1-2 | 11-1 | 111-2 | 80% | 5% | 15% | 30000 |
| Copolymer 11 | 1-2 | 11-2 | 111-2 | 80% | 5% | 15% | 30000 |
| Copolymer 12 | 1-2 | 11-3 | 111-2 | 80% | 5% | 15% | 30000 |
| Copolymer 13 | 1-1 | 11-1 | 111-2 | 60% | 20% | 20% | 30000 |
| Copolymer 14 | 1-1 | 11-1 | 111-2 | 70% | 10% | 20% | 100000 |
| Copolymer 15 | 1-1 | 11-1 | 111-2 | 85% | 5% | 10% | 50000 |
| Copolymer 16 | 1-1 | 11-1 | / | 80% | 20% | / | 30000 |

II. Preparation of Battery

Example 1

Preparation of Positive Electrode Sheet

The copolymer 1 prepared above, conductive carbon black as a conductive agent (Super-P) and styrene-acrylic emulsion as a binder were added into deionized water as a solvent in a mass ratio of 70:15:15, and fully stirred to prepare a slurry. The obtained slurry was coated on surfaces at both sides of a aluminum foil as a current collector, and then dried to form a coating layer with a thickness of 2 μm.

$LiNi_{0.8}Co_{0.1}Mn_{0.1}O_2$ (NCM811) as a positive-electrode active material, acetylene black as a conductive agent, and polyvinylidene fluoride (PVDF) as a binder were added into NMP as a solvent in a mass ratio of 97:2:1, and mixed under thoroughly stirring to form a uniform positive electrode slurry, the obtained positive electrode slurry was coated on the surface of the coating layer, and then dried and cold-pressed to obtain the positive electrode sheet.

Preparation of Negative Electrode Sheet

Artificial graphite as a negative-electrode active material, conductive carbon black (Super-P) as a conductive agent, styrene-butadiene rubber (SBR) as a binder, sodium carboxymethyl cellulose (CMC) as a thickener were mixed according to the mass ratio of 96:1:1.8:1.2, added into deionized water, and fully mixed under stirring to form a uniform negative electrode slurry, the obtained negative electrode slurry was coated onto the surface of a copper foil as a negative-electrode current collector, dried, cold-pressed, slitted and cut to obtain the negative electrode sheet.

Preparation of Electrolyte Solution

Ethylene carbonate (EC) and diethyl carbonate (DEC) were mixed in a mass ratio of 50:50 to obtain the electrolyte solution.

Preparation of Secondary Battery

The positive electrode sheet, the separator and the negative electrode sheet were stacked in sequence, so that the separator is located between the positive electrode sheet and the negative electrode sheet to play a role of isolation, and then they were wound to obtain a electrode assembly. The electrode assembly was placed in an outer package, injected with the formulated electrolyte solution, and encapsulated to obtain the secondary battery.

Examples 2-15

The preparation methods of them were similar to that of Example 1, except that a different copolymer was selected in the coating layer. See Table 3 below for details.

Comparative Example 1

The preparation method of it was similar to that of Example 1, except that the coating layer was arranged on neither surface of the positive-electrode current collector.

Comparative Example 2

The preparation methods of them were similar to that of Example 1, except that a different copolymer was selected in the coating layer. See Table 3 below for details.

For the secondary batteries prepared in the aforementioned examples and comparative examples, a battery performance test was carried out by the following methods, and the obtained results were shown in Table 3.

III. Battery Performance Test

1. Overcharge Performance Test

The prepared secondary battery was subjected to thermal insulation with thermal insulation cotton placed at both ends of the outside of the battery, and charged at a charging rate of 1 C. During the charging process, the temperature at the surface of the battery and the battery voltage were monitored.

When the temperature of the battery surface reached 120° C. and above, and the battery voltage risen sharply to 8.5 V within 5 minutes, the situation was judged as "o", and meanwhile the time required for the battery to rise sharply to 8.5 V was recorded;

when the temperature of the battery surface reached 120° C. and above, and the battery voltage did not rise sharply to 8.5 V within 5 minutes, the situation was judged as "x".

2. Cycling Capacity Retention Rate

At 25° C., the secondary batteries prepared in the examples and comparative examples were charged at a constant current rate of 0.5 C to a charging cut-off voltage of 4.25 V, then charged at a constant voltage to a current of ≤0.05 C and allowed to stand for 30 min, and then discharged at a constant current rate of 1 C to a discharging cut-off voltage of 2.8 V and allowed to stand for 30 min, and the battery capacity C0 at this time was recorded. According to this method, the battery was charged and discharged for 1500 cycles, and the battery capacity after 1500 cycles was recorded as C1. The cycling capacity retention rate at 25° C. of the secondary battery was calculated by the following formula.

The cycling capacity retention rate at 25° C. of the battery=C1/C0×100%.

TABLE 3

| | Secondary battery Positive electrode sheet | | | Performance evaluation | | |
|---|---|---|---|---|---|---|
| Serial Number | Type of the copolymer in the coating layer | Mass proportion of the copolymer in the coating layer | Thickness of the coating layer | Improvement of overcharge | Time (minutes) required for the battery to rise sharply to 8.5 V | cycling capacity retention rate (1,500 times) |
| Example 1 | Copolymer 1 | 70% | 2 μm | o | 2.9 | 82.3% |
| Example 2 | Copolymer 2 | 70% | 2 μm | o | 3.1 | 82.6% |
| Example 3 | Copolymer 3 | 70% | 2 μm | o | 3.5 | 82.2% |
| Example 4 | Copolymer 4 | 70% | 2 μm | o | 2.5 | 82.9% |
| Example 5 | Copolymer 5 | 70% | 2 μm | o | 2.7 | 81.9% |
| Example 6 | Copolymer 6 | 70% | 2 μm | o | 3.2 | 82.4% |
| Example 7 | Copolymer 7 | 70% | 2 μm | o | 3.4 | 81.8% |
| Example 8 | Copolymer 8 | 70% | 2 μm | o | 3.8 | 82.8% |
| Example 9 | Copolymer 9 | 70% | 2 μm | o | 3.9 | 82.5% |
| Example 10 | Copolymer 10 | 70% | 2 μm | o | 3.0 | 82.1% |
| Example 11 | Copolymer 11 | 70% | 2 μm | o | 3.2 | 82.2% |
| Example 12 | Copolymer 12 | 70% | 2 μm | o | 3.5 | 82.7% |
| Example 13 | Copolymer 13 | 70% | 2 μm | o | 4.2 | 82.6% |
| Example 14 | Copolymer 14 | 70% | 2 μm | o | 3.7 | 82.7% |
| Example 15 | Copolymer 15 | 70% | 2 μm | o | 2.9 | 81.9% |
| Comparative Example 1 | No | — | — | x | — (*) | 86.5% |
| Comparative Example 2 | Copolymer 16 | 70% | 2 μm | x | — (*) | 74.8% |

(*) indicates that the voltage of the battery could not rise to 8.5 V even if it was overcharged for a long time.

According to the results in Table 3 above, it could be seen that in Examples 1-15 including the copolymers of the present application including the structural unit (I), the structural unit (II) and the structural unit (III), both good overcharge safety and a relatively higher cycling capacity retention rate could be taken into account, and thus both good overcharge safety and cycling performance could be taken into account. On the other hand, in Comparative Examples 1 and 2 without the copolymer of the present application, the safety of the battery during overcharging was low, and the probability of overheating, fire or explosion of the battery during overcharging was high; further, the cycling performance of the battery was also deteriorated significantly.

Additionally, by making the ratios of respective structural units, i.e., $a/(a+b+c) \times 100\%$, $b/(a+b+c) \times 100\%$, and $c/(a+b+c) \times 100\%$, respectively in appropriate ranges, the time required to reach the overcharging cut-off voltage could be further shortened without significantly affecting the cycling capacity retention rate, that was, the safety of the battery during overcharging could be further improved.

Examples 16-18

The preparation methods of them were similar to that of Example 4, except that the thickness of the coating layer was different. See Table 4 below for details.

Examples 19-25

The preparation methods of them were similar to that of Example 4, except that the mass ratio of the polymer in the coating layer was different. See Table 4 below for details.

Further, the performance of the prepared secondary battery was tested by the aforementioned battery performance testing method. The obtained results were shown in Table 4.

According to the results in Table 4 above, it could be seen that when the thickness of the coating layer was within an appropriate range, the time required to reach the overcharging cut-off voltage could be further shortened without significantly affecting the cycling capacity retention rate, so that the miniaturization, relatively higher cycling capacity retention rate and more excellent overcharge safety of the secondary battery could be taken into account at the same time.

Further, according to the results in Table 4 above, it could be seen that when the content of the copolymer in the coating layer was appropriate, the time required to reach the overcharging cut-off voltage could be further shortened while maintaining a relatively higher cycling capacity retention rate, and the safety of the battery during overcharging was further improved. On the other hand, when the content of the copolymer in the coating layer was too high, and the content of the conductive agent was too low, the conductive network was insufficient, thereby reducing the cycling capacity retention rate. When the content of the copolymer in the coating layer was too low, the time required to reach the overcharging cut-off voltage became longer.

It should be understood by those of ordinary skills in the art that the aforementioned examples are only some specific examples for realizing the present application, and in practical applications, various changes and modifications can be made to them in form and details, all of which fall within the scope of protection of the present application.

The invention claimed is:

1. A secondary battery comprising:
   a positive electrode sheet including:
   a positive-electrode current collector;
   a positive-electrode active material layer; and
   a coating layer arranged between the positive-electrode current collector and the positive-electrode active material layer;

TABLE 4

| | Secondary battery Positive electrode sheet | | | Performance evaluation | | |
|---|---|---|---|---|---|---|
| Serial Number | Type of the copolymer in the coating layer | Mass proportion of the copolymer in the coating layer | Thickness of the coating layer | Improvement of overcharge | Time (minutes) required for the battery to rise sharply to 8.5 V | cycling capacity retention rate (1,500 times) |
| Example 16 | Copolymer 4 | 70% | 0.5 μm | ○ | 2.9 | 82.7% |
| Example 4 | Copolymer 4 | 70% | 2 μm | ○ | 2.5 | 82.9% |
| Example 17 | Copolymer 4 | 70% | 5 μm | ○ | 3.3 | 80.8% |
| Example 18 | Copolymer 4 | 70% | 10 μm | ○ | 3.8 | 79.5% |
| Example 19 | Copolymer 4 | 50% | 2 μm | ○ | 4.8 | 82.5% |
| Example 20 | Copolymer 4 | 60% | 2 μm | ○ | 4.2 | 82.3% |
| Example 21 | Copolymer 4 | 65% | 2 μm | ○ | 3.4 | 82.2% |
| Example 22 | Copolymer 4 | 75% | 2 μm | ○ | 2.6 | 79.3% |
| Example 23 | Copolymer 4 | 80% | 2 μm | ○ | 2.5 | 77.8% |
| Example 24 | Copolymer 4 | 85% | 2 μm | ○ | 2.4 | 76.2% |
| Example 25 | Copolymer 4 | 90% | 2 μm | ○ | 2.4 | 75.3% | wherein:
the coating layer includes a conductive agent and a copolymer, and the copolymer includes: structural unit (I), structural unit (II), and structural unit (III) as follows:

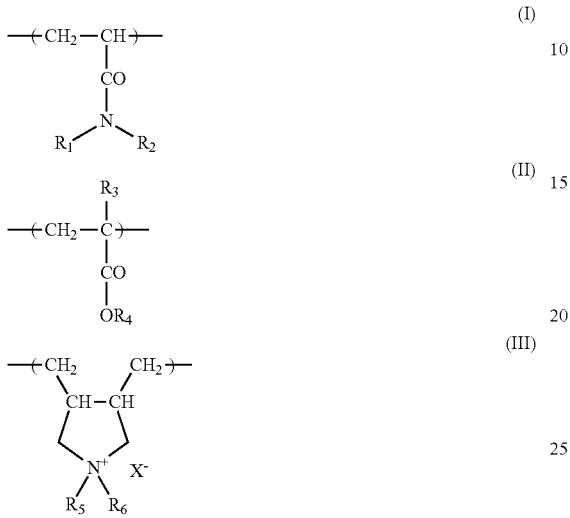

in the structural unit (I):
$R_1$ and $R_2$ each independently represent a hydrogen atom, an unsubstituted or substituted alkyl group having 1-10 carbon atoms, an unsubstituted or substituted alkoxy group having 1-10 carbon atoms, or an unsubstituted or substituted alkenyl group having 1-10 carbon atoms, and
a substituent for the substituted alkyl group having 1-10 carbon atoms, the substituted alkoxy group having 1-10 carbon atoms, and the substituted alkenyl group having 1-10 carbon atoms in $R_1$ and $R_2$ is at least one selected from hydroxyl, amino, amide, cyano, and carboxyl,
in the structural unit (II):
$R_3$ represents a hydrogen atom, an unsubstituted or substituted alkyl group having 1-10 carbon atoms, an unsubstituted or substituted alkoxy group having 1-10 carbon atoms, an unsubstituted or substituted alkenyl group having 1-10 carbon atoms, or an aryl group having 5-20 carbon atoms, and a substituent for the substituted alkyl group having 1-10 carbon atoms, the substituted alkoxy group having 1-10 carbon atoms, and the substituted alkenyl group having 1-10 carbon atoms in $R_3$ is at least one selected from halogen, hydroxyl, amino, amide, cyano, and carboxyl,
$R_4$ represents a hydrogen atom, an unsubstituted or substituted alkyl group having 1-10 carbon atoms, an inorganic metal ion, or $-R_{10}NR_{11}R_{12}$, a substituent for the substituted alkyl group having 1-10 carbon atoms in $R_4$ is at least one selected from halogen, hydroxyl, amino, amide, cyano, and carboxyl, and the inorganic metal ion is a sodium ion, a potassium ion, a lithium ion, a calcium ion, or a magnesium ion,
$R_{10}$ represents an unsubstituted or substituted alkylene group having 1-10 carbon atoms or an unsubstituted or substituted alkenylene group having 2-10 carbon atoms, and a substituent for the substituted alkylene group having 1-10 carbon atoms and the substituted alkenylene group having 2-10 carbon atoms in $R_{10}$ is at least one selected from halogen, hydroxyl, amino, amide, cyano, and carboxyl, and
$R_{11}$ and $R_{12}$ each independently represent an unsubstituted or substituted alkyl group having 1-10 carbon atoms, an unsubstituted or substituted alkenyl group having 1-10 carbon atoms or an aryl group having 5-20 carbon atoms, and a substituent for the substituted alkyl group having 1-10 carbon atoms and the substituted alkenyl group having 1-10 carbon atoms in $R_{11}$ and $R_{12}$ is at least one selected from halogen, hydroxyl, amino, amide, cyano and carboxyl, and in the structural unit (III):
$R_5$ and $R_6$ each independently represent a hydrogen atom, an unsubstituted or substituted alkyl group having 1-10 carbon atoms, $X^-$ represents an anion selected from a halogen ion, a sulfate ion, and a sulfonate ion, and a substituent for the substituted alkyl group having 1-10 carbon atoms in $R_5$ and $R_6$ is at least one selected from halogen, hydroxyl, amino, amide, cyano, and carboxyl.

2. The secondary battery of claim 1, wherein:
in the coating layer, a content of the copolymer is more than 50 wt %.

3. The secondary battery of claim 1, wherein:
a thickness of the coating layer is 0.1-20 μm.

4. The secondary battery of claim 1, wherein:
the conductive agent includes at least one of conductive graphite, conductive carbon black, Ketjen black, acetylene black, carbon fiber, carbon nanotube, or graphene.

5. The secondary battery of claim 1, wherein:
the coating layer further includes a binder, the binder including at least one of styrene-acrylic emulsion, sodium carboxymethyl cellulose, polyvinyl alcohol, polyacrylamide, or polyacrylate.

6. The secondary battery of claim 1, wherein:
the copolymer satisfies $60\% \leq a/(a+b+c) \times 100\%$, where a denotes an average molar number of monomers of the structural unit (I), b denotes an average molar number of monomers of the structural unit (II), and c denotes an average molar number of monomers of the structural unit (III).

7. The secondary battery of claim 1, wherein:
the copolymer satisfies: $b/(a+b+c) \times 100\% \leq 20\%$, where a denotes an average molar number of monomers of the structural unit (I), b denotes an average molar number of monomers of the structural unit (II), and c denotes an average molar number of monomers of the structural unit (III).

8. The secondary battery of claim 1, wherein:
the copolymer satisfies: $c/(a+b+c) \times 100\% \leq 20\%$, where a denotes an average molar number of monomers of the structural unit (I), b denotes an average molar number of monomers of the structural unit (II), and c denotes an average molar number of monomers of the structural unit (III).

9. The secondary battery of claim 1, wherein: in the structural unit (I), R1 and R2 each independently are the hydrogen atom, or the unsubstituted or substituted alkyl group having 1-10 carbon atoms.

10. The secondary battery of claim 1, wherein in the structural unit (II): R3 is the hydrogen atom, or the unsubstituted or substituted alkyl group having 1-10 carbon atoms;

and R4 is the hydrogen atom, an inorganic metal ion, or the unsubstituted or substituted alkyl group having 1-10 carbon atoms.

11. The secondary battery of claim 1, wherein in the structural unit (III): R5 and R6 each independently are the hydrogen atom, or the unsubstituted or substituted alkyl group having 1-10 carbon atoms; and X⁻ is the anion selected from the halogen ion.

12. The secondary battery of claim 1, wherein:
the structural unit (I), structural unit (II), and structural unit (III) are copolymerized in a random or block manner.

13. The secondary battery of claim 1, wherein:
the copolymer has a number average molecular weight of 10,000 to 100,000.

14. A battery module comprising a secondary battery including:
a positive electrode sheet including:
a positive-electrode current collector;
a positive-electrode active material layer; and
a coating layer arranged between the positive-electrode current collector and the positive-electrode active material layer;
wherein:
the coating layer includes a conductive agent and a copolymer, and the copolymer includes: structural unit (I), structural unit (II), and structural unit (III) as follows:

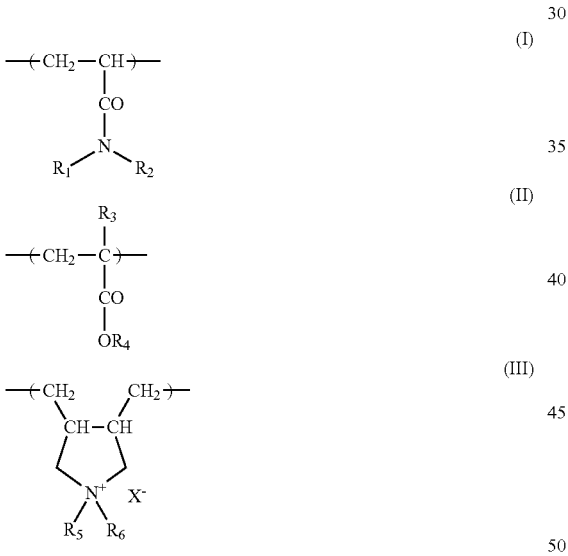

in the structural unit (I):
$R_1$ and $R_2$ each independently represent a hydrogen atom, an unsubstituted or substituted alkyl group having 1-10 carbon atoms, an unsubstituted or substituted alkoxy group having 1-10 carbon atoms, or an unsubstituted or substituted alkenyl group having 1-10 carbon atoms, and
a substituent for the substituted alkyl group having 1-10 carbon atoms, the substituted alkoxy group having 1-10 carbon atoms, and the substituted alkenyl group having 1-10 carbon atoms in $R_1$ and $R_2$ is at least one selected from hydroxyl, amino, amide, cyano, and carboxyl,
in the structural unit (II):
$R_3$ represents a hydrogen atom, an unsubstituted or substituted alkyl group having 1-10 carbon atoms, an unsubstituted or substituted alkoxy group having 1-10 carbon atoms, an unsubstituted or substituted alkenyl group having 1-10 carbon atoms, or an aryl group having 5-20 carbon atoms, and a substituent for the substituted alkyl group having 1-10 carbon atoms, the substituted alkoxy group having 1-10 carbon atoms, and the substituted alkenyl group having 1-10 carbon atoms in $R_3$ is at least one selected from halogen, hydroxyl, amino, amide, cyano, and carboxyl, $R_4$ represents a hydrogen atom, an unsubstituted or substituted alkyl group having 1-10 carbon atoms, an inorganic metal ion, or $-R_{10}NR_{11}R_{12}$, a substituent for the substituted alkyl group having 1-10 carbon atoms in $R_4$ is at least one selected from halogen, hydroxyl, amino, amide, cyano, and carboxyl, and the inorganic metal ion is a sodium ion, a potassium ion, a lithium ion, a calcium ion, or a magnesium ion, $R_{10}$ represents an unsubstituted or substituted alkylene group having 1-10 carbon atoms or an unsubstituted or substituted alkenylene group having 2-10 carbon atoms, and a substituent for the substituted alkylene group having 1-10 carbon atoms and the substituted alkenylene group having 2-10 carbon atoms in $R_{10}$ is at least one selected from halogen, hydroxyl, amino, amide, cyano, and carboxyl, and $R_{11}$ and $R_{12}$ each independently represent an unsubstituted or substituted alkyl group having 1-10 carbon atoms, an unsubstituted or substituted alkenyl group having 1-10 carbon atoms or an aryl group having 5-20 carbon atoms, and a substituent for the substituted alkyl group having 1-10 carbon atoms and the substituted alkenyl group having 1-10 carbon atoms in $R_{11}$ and $R_{12}$ is at least one selected from halogen, hydroxyl, amino, amide, cyano and carboxyl, and in the structural unit (III):
$R_5$ and $R_6$ each independently represent a hydrogen atom, an unsubstituted or substituted alkyl group having 1-10 carbon atoms, X⁻ represents an anion selected from a halogen ion, a sulfate ion, and a sulfonate ion, and a substituent for the substituted alkyl group having 1-10 carbon atoms in $R_5$ and $R_6$ is at least one selected from halogen, hydroxyl, amino, amide, cyano, and carboxyl.

15. A battery pack comprising the battery module of claim 14.

16. A device comprising a secondary battery including:
a positive electrode sheet including:
a positive-electrode current collector;
a positive-electrode active material layer; and
a coating layer arranged between the positive-electrode current collector and the positive-electrode active material layer;
wherein:
the coating layer includes a conductive agent and a copolymer, and the copolymer includes: structural unit (I), structural unit (II), and structural unit (III) as follows:

-continued

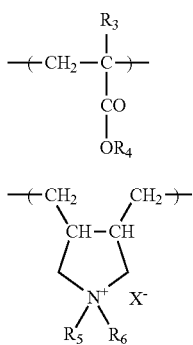

(II)

(III)

in the structural unit (I):
  $R_1$ and $R_2$ each independently represent a hydrogen atom, an unsubstituted or substituted alkyl group having 1-10 carbon atoms, an unsubstituted or substituted alkoxy group having 1-10 carbon atoms, or an unsubstituted or substituted alkenyl group having 1-10 carbon atoms, and
  a substituent for the substituted alkyl group having 1-10 carbon atoms, the substituted alkoxy group having 1-10 carbon atoms, and the substituted alkenyl group having 1-10 carbon atoms in $R_1$ and $R_2$ is at least one selected from hydroxyl, amino, amide, cyano, and carboxyl,
in the structural unit (II):
  $R_3$ represents a hydrogen atom, an unsubstituted or substituted alkyl group having 1-10 carbon atoms, an unsubstituted or substituted alkoxy group having 1-10 carbon atoms, an unsubstituted or substituted alkenyl group having 1-10 carbon atoms, or an aryl group having 5-20 carbon atoms, and a substituent for the substituted alkyl group having 1-10 carbon atoms, the substituted alkoxy group having 1-10 carbon atoms, and the substituted alkenyl group having 1-10 carbon atoms in $R_3$ is at least one selected from halogen, hydroxyl, amino, amide, cyano, and carboxyl,
  $R_4$ represents a hydrogen atom, an unsubstituted or substituted alkyl group having 1-10 carbon atoms, an inorganic metal ion, or $-R_{10}NR_{11}R_{12}$, a substituent for the substituted alkyl group having 1-10 carbon atoms in $R_4$ is at least one selected from halogen, hydroxyl, amino, amide, cyano, and carboxyl, and the inorganic metal ion is a sodium ion, a potassium ion, a lithium ion, a calcium ion, or a magnesium ion,
  $R_{10}$ represents an unsubstituted or substituted alkylene group having 1-10 carbon atoms or an unsubstituted or substituted alkenylene group having 2-10 carbon atoms, and a substituent for the substituted alkylene group having 1-10 carbon atoms and the substituted alkenylene group having 2-10 carbon atoms in $R_{10}$ is at least one selected from halogen, hydroxyl, amino, amide, cyano, and carboxyl, and
  $R_{11}$ and $R_{12}$ each independently represent an unsubstituted or substituted alkyl group having 1-10 carbon atoms, an unsubstituted or substituted alkenyl group having 1-10 carbon atoms or an aryl group having 5-20 carbon atoms, and a substituent for the substituted alkyl group having 1-10 carbon atoms and the substituted alkenyl group having 1-10 carbon atoms in $R_{11}$ and $R_{12}$ is at least one selected from halogen, hydroxyl, amino, amide, cyano and carboxyl, and in the structural unit (III):
  $R_5$ and $R_6$ each independently represent a hydrogen atom, an unsubstituted or substituted alkyl group having 1-10 carbon atoms, $X^-$ represents an anion selected from a halogen ion, a sulfate ion, and a sulfonate ion, and a substituent for the substituted alkyl group having 1-10 carbon atoms in $R_5$ and $R_6$ is at least one selected from halogen, hydroxyl, amino, amide, cyano, and carboxyl.

* * * * *